United States Patent
Kim (10) Patent No.: US 12,247,918 B2
(45) Date of Patent: Mar. 11, 2025

(54) METHOD AND DEVICE FOR SIMULATING A SOLAR SPECTRUM

(71) Applicant: United States of America as Represented by the Secretary of the Army (U.S. Army), Washington, DC (US)

(72) Inventor: Hajin Kim, Huntsville, AL (US)

(73) Assignee: USA as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/558,515

(22) Filed: Dec. 2, 2014

(65) Prior Publication Data
US 2024/0418643 A1    Dec. 19, 2024

(51) Int. Cl.
*G01N 21/39* (2006.01)
*G01N 21/01* (2006.01)
(Continued)

(52) U.S. Cl.
CPC ............ *G01N 21/39* (2013.01); *G01N 21/01* (2013.01); *G01N 21/3581* (2013.01);
(Continued)

(58) Field of Classification Search
CPC .... G01N 21/39; G01N 21/01; G01N 21/3581; G01N 21/359; G01N 2021/393;
(Continued)

(56) References Cited

U.S. PATENT DOCUMENTS 3,177,672 A * 4/1965 Seelandt ................ B64G 7/00
62/55.5
5,623,149 A   4/1997 Kilmer
(Continued)

FOREIGN PATENT DOCUMENTS

KR    20110055037 A  *  5/2011

OTHER PUBLICATIONS

Technical Note; Simulation of Solar Irradiation; Apr. 1, 1986; http://www.newport.com/Technical-Note-Simulation-of-Solar-Irradiation/411986/1033/.
(Continued)

*Primary Examiner* — Kiho Kim
(74) *Attorney, Agent, or Firm* — William B. Haymond (57) ABSTRACT

The application relates to a method of testing an item with a spectrally precise, artificial solar spectrum including wavelengths from 200 nm to 20 microns and it also relates to a solar spectrum simulator capable of producing a light spectrum including wavelengths from 200 nm to 20 microns. The simulator comprises: a) amplitude optimization software; b) a spectrum controller; c) an emitter controller; d) heat lamp/heater generation sources including: a xenon/infrared (IR) lamp and a blackbody radiator; e) laser generation sources including an ultraviolet (UV) laser source, a visible laser source, a near infrared (NIR) laser source, a short wavelength (SW) laser source, a medium wavelength (MW) laser source, a long wavelength (LW) laser source, and a quantum cascade laser source (QCL); f) a beam combiner; g) a beam profiler; h) a spectrometer; and i) a surface on which can be placed an item to be tested.

20 Claims, 10 Drawing Sheets

(51) Int. Cl.
*G01N 21/3581* (2014.01)
*G01N 21/359* (2014.01)

(52) U.S. Cl.
CPC ..... *G01N 21/359* (2013.01); *G01N 2021/393* (2013.01); *G01N 2021/399* (2013.01); *G01N 2201/0612* (2013.01); *G01N 2201/0632* (2013.01); *G01N 2201/0633* (2013.01); *G01N 2201/0813* (2013.01)

(58) Field of Classification Search
CPC ..... G01N 2021/399; G01N 2201/0612; G01N 2201/0632; G01N 2201/0633; G01N 2201/0813
See application file for complete search history.

(56) References Cited

U.S. PATENT DOCUMENTS

| | | | |
|---|---|---|---|
| 7,514,931 | B1 | 4/2009 | Shimotomai |
| 7,839,503 | B2 | 11/2010 | Jungwirth |
| 8,378,661 | B1 | 2/2013 | Cravey |
| 2006/0176694 | A1 | 8/2006 | Lee |
| 2011/0026254 | A1 | 2/2011 | Li |
| 2012/0014085 | A1 | 1/2012 | Minami |
| 2012/0025838 | A1 | 2/2012 | Lee |
| 2013/0134885 | A1 | 5/2013 | Linden |
| 2013/0194564 | A1 | 8/2013 | Stapelmann |
| 2013/0294045 | A1 | 11/2013 | Morgenbrod |
| 2014/0022756 | A1 | 1/2014 | Roest |

OTHER PUBLICATIONS

Sander W. Hogewoning et al.; An artificial solar spectrum substantially alters plant development compared with usual climate room irradiance spectra; Mar. 4, 2010; Journal of Experimental Botany (2010) 61 (5): 1267-1276; http://jxb.oxfordjournals.org/content/61/5/1267.long.

* cited by examiner

METHOD AND DEVICE FOR SIMULATING A SOLAR SPECTRUM

BACKGROUND

Existing solar simulator systems, often used for the testing of sensors, are based on flash lamps, heat lamps and heaters. Xenon lamp-based systems, such as the solar simulator at Jet Propulsion Laboratory, have been around for decades. But, the spectrum is not controllable except by putting filters between the light sources and the unit under testing (UUT). Furthermore, the resulting spectrum of these existing solar simulator systems extends only into the near infrared (NIR) region (i.e., having a wavelength of 1-2 microns). The spectral radiance of spectra produced by black body radiators or by xenon lamps is very limited beyond 2 microns (2000 nm). Heat lamps/heaters have also been used, but these devices are inefficient in producing the desired spectrum, since they can only achieve a temperature up to around 3000 Kelvin (K). Therefore, in order to achieve something resembling the solar spectrum, much of the heat in heat lamps and heaters has to be filtered out. Thus, outside of a nuclear laboratory, there has so far been no usable man-made IR source that can, even rudimentarily, replicate the full solar IR spectrum. Conventionally, testing of sensors outdoors in actual sunlight is the only realistic option, but such testing is limited to the specific local weather and light conditions and the time interval during which such specific local weather and light conditions exist. This makes performing a thorough testing of sensors difficult.

Solar simulator systems built only with lamps and heaters can produce amounts of irradiant energy similar to the sun, but they lack the spectral accuracy to closely replicate the entire solar spectrum. Also, in such systems, the simulated spectrum cannot be changed fast enough to replicate a realistic solar environment required for sensor testing applications.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present application provides a means for replicating and producing user-defined arbitrary spectra. Such means include producing a solar spectrum ranging from UV (wavelengths as low as 200 nm) to LWIR (wavelengths as high as 20 microns). The present application describes a solar spectrum generator for generating a precise spectrum closely replicating actual solar spectra. The spectra of the present application, which are generated by the solar spectrum generator, can be changed quickly from one specific spectrum to another specific spectrum. The solar spectrum generator of the present application can also be used for various applications such as sensor testing, solar panel testing, and producing customized UV, visible, and infrared spectra. The infrared spectra produced by the solar spectrum generator of the present application extend from shortwave infrared (SWIR) to LWIR.

The present application provides a means for producing spectrally precise spectra including an artificial solar spectrum ranging from UV to LWIR spectrum which closely simulates a natural solar spectrum. For the purpose of testing sensors, producing a precise artificial spectrum very similar to the spectrum of real sunlight is very useful and important.

In order to produce a spectrum that matches the spectrum of very hot objects (like the sun) without using an enormous power input, the present application utilizes UV, visible, and IR sources, each of which is individually controlled. In addition, the present application also uses: beam combiner optics, beam profiler optics, amplitude optimization software, an electrical output controller, an IR spectrometer, and a testing surface on which the object being tested can be placed. In a preferred embodiment, the testing surface is a 3-axis motion table.

The present application has the capability to modify, as required, a given spectrum extending from UV to LWIR by adjusting the outputs from each emitter source to match a variety of desired environmental conditions. This includes the capability to manipulate the spectrum to represent not only atmospheric conditions but even to produce arbitrary spectra that would not likely be found in a natural environment. The output of the system is a desired spectrum with sub-micron (below 1 micron) resolution. In a preferred embodiment, the spectrum has a resolution of at most approximately 0.1 micrometer increments. The spectrum is produced by a combination of light sources, including a blackbody radiator, a xenon/IR lamp, and lasers, all of which are combined to produce the desired output spectrum.

It has been observed that unexpected imageries are sometimes obtained when testing IR sensors in actual sunlight. These unexpected imageries are often due to internal reflections of a given sensor UUT in the sunlight environment. Such imagery is difficult to replicate with conventional IR sources due to several factors including: 1) the limited spectrum and power output of such conventional IR sources, 2) the complexity of the sensor optics and other components necessary to combine and convey the light from a source, and 3) the lack of a repeatable source. Limited testing was performed outdoors with real sunlight, but an indoor testing environment using the artificial solar spectrum of the present application provided much more flexibility and repeatability throughout the testing process. The present application provides a sensor testing environment that produces artificial spectra, including unexpected imageries due to internal reflections, that are very close in actual characteristics to actual solar spectra.

In an embodiment, the application creates beams that simulate solar energy from UV to LWIR spectra. The application can be used, for example, with a sensor UUT.

One of the problems overcome by the present application was the need to filter out undesirable IR noises created by the sun's IR radiation. The present application can produce spectra without such undesirable IR noise.

The sun produces spectral power equivalent to a blackbody radiator near 5800 K. Depending on the sensor's location in relation to actual solar rays, the spectral irradiance profiles vary, due to the sub-band absorption in the IR regions. The replication by a solar simulator of the total infrared (from NIR to LWIR) solar irradiance at the Earth's surface presents significant technological challenges. The system of the present application replicates the total solar spectral irradiance with a fine spectral resolution (with increments of at most approximately 0.1 micrometer). Other existing sources and optical systems that have been shown to accomplish this are not known by the applicant to exist at the current time.

The present application utilizes lower temperature blackbody radiator and xenon/IR lamp sources (between 1000-3000 Kelvin) to build the foundation spectrum. This includes visible light from black body radiation (FIG. 1), mid LWIR light from black body radiation (FIG. 2), and very LWIR light from black body radiation (FIG. 3).

Figure 1:
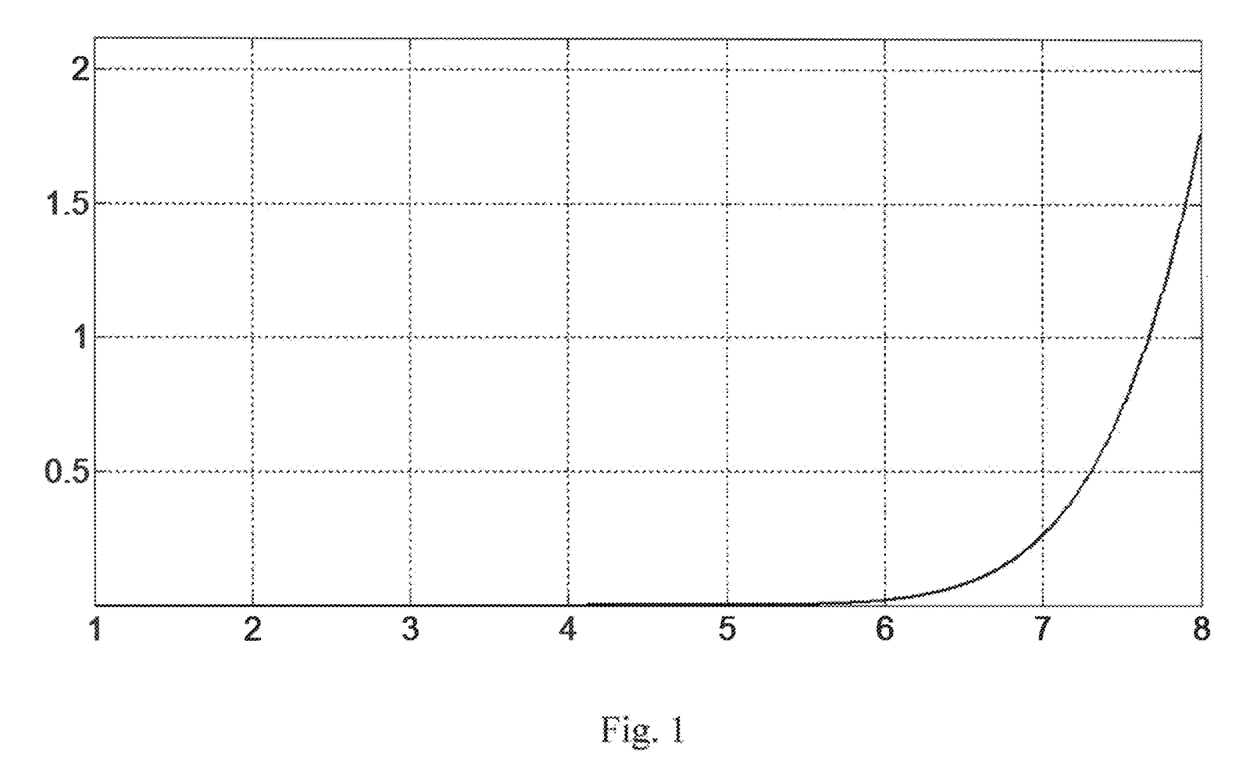
FIG. 1 shows a graph plotting Wavelength vs. Radiance for a Black Body Spectral Radiance in Visible Spectrum at 1000° K.

FIG. 1 plots wavelength (in hundreds of nanometers) vs. radiance (in microwatts/cm$^2$/nanometer) at 1000 Kelvin. In FIG. 1, the y scale is 100× magnified.

Figure 2:
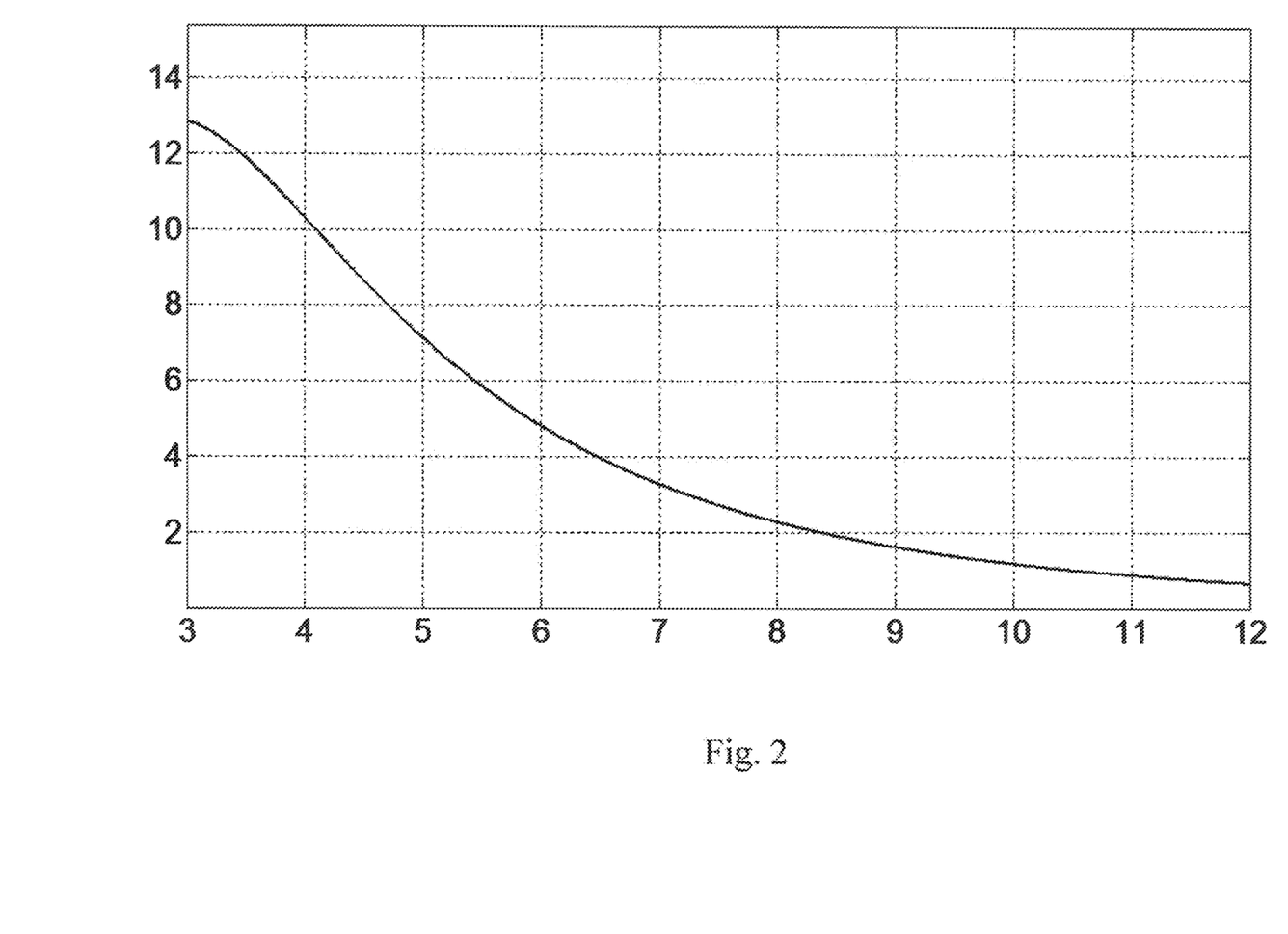
FIG. 2 shows a graph plotting Wavelength for a Black Body Spectral Radiance in Mid-Long Wavelength IR (Mid-LWIR) at 1000° K.

FIG. 2 plots wavelength (in micrometers) vs. radiance (in hundreds of microwatts/cm$^2$/nanometer) at 1000 Kelvin.

Figure 3:
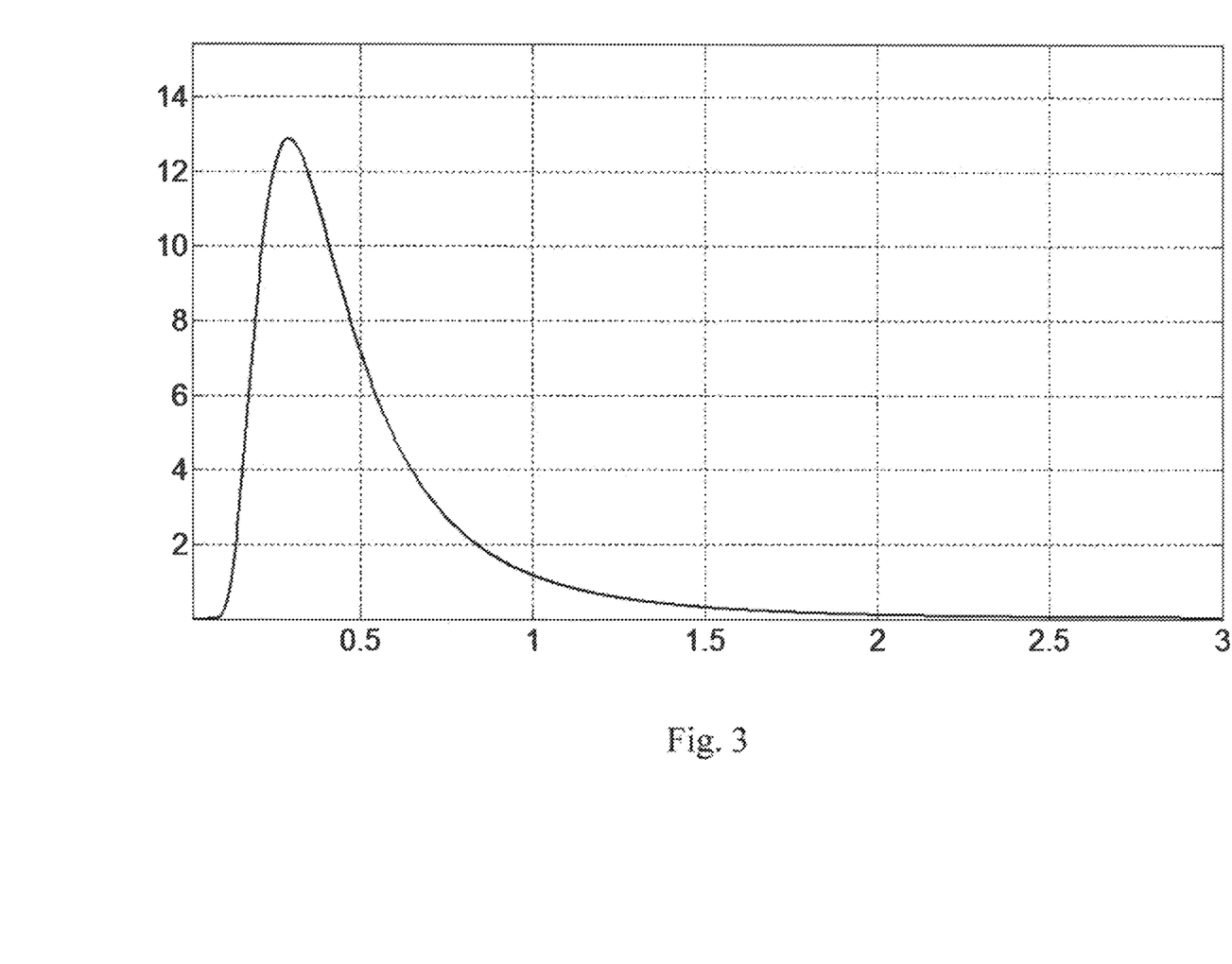
FIG. 3 shows a graph plotting Wavelength vs. Radiance for a Black Body Spectral Radiance in Very Long Wavelength IR (Very LWIR) at 1000° K.

FIG. 3 plots wavelength (in tens of micrometers) vs. radiance (in hundreds of microwatts/cm$^2$/nanometer) at 1000 Kelvin.

Figure 4:
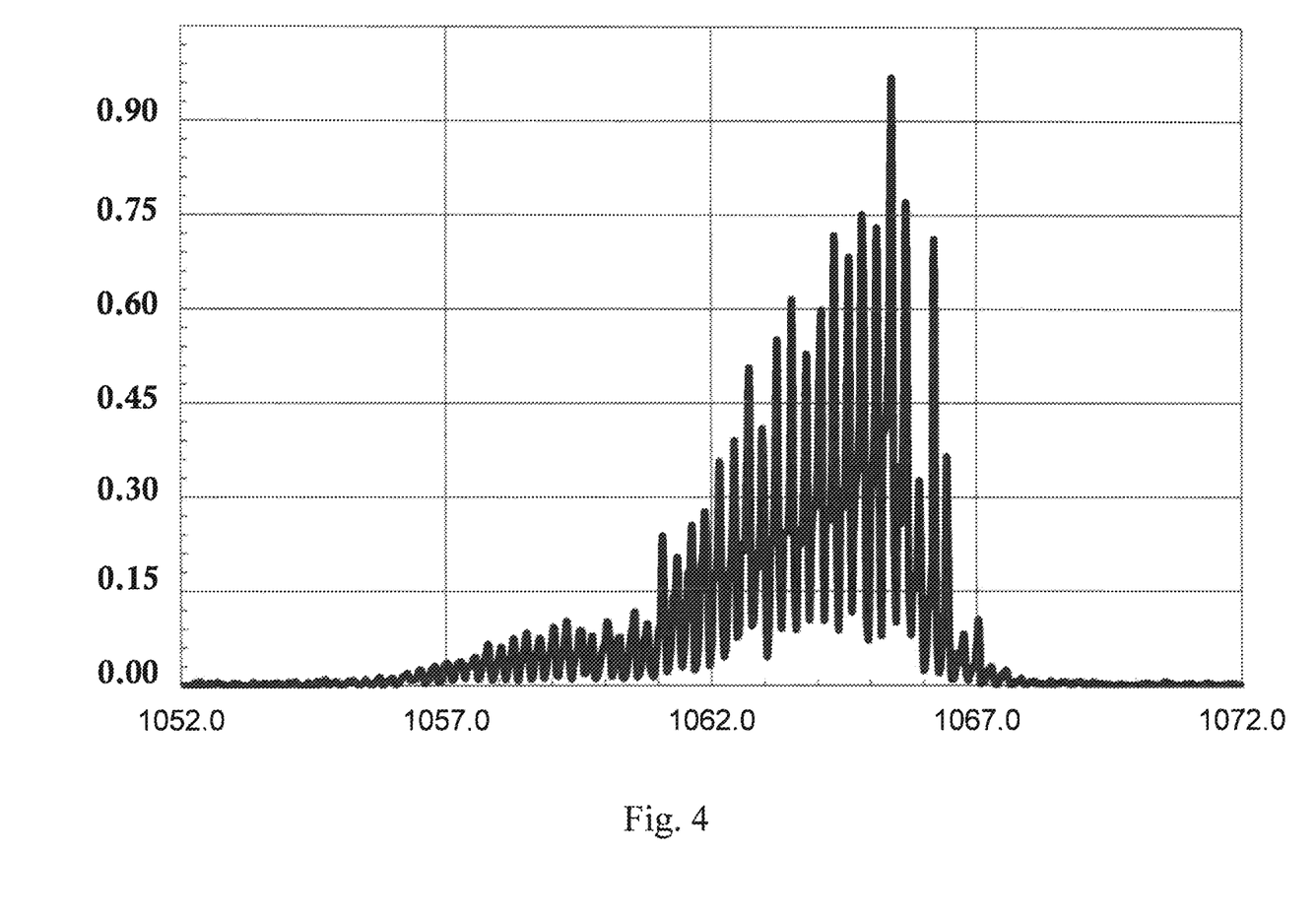
FIG. 4 is a sample NIR Laser Diode Spectrum plotting wavelength in microns vs. normalized amplitude.
Figure 5:
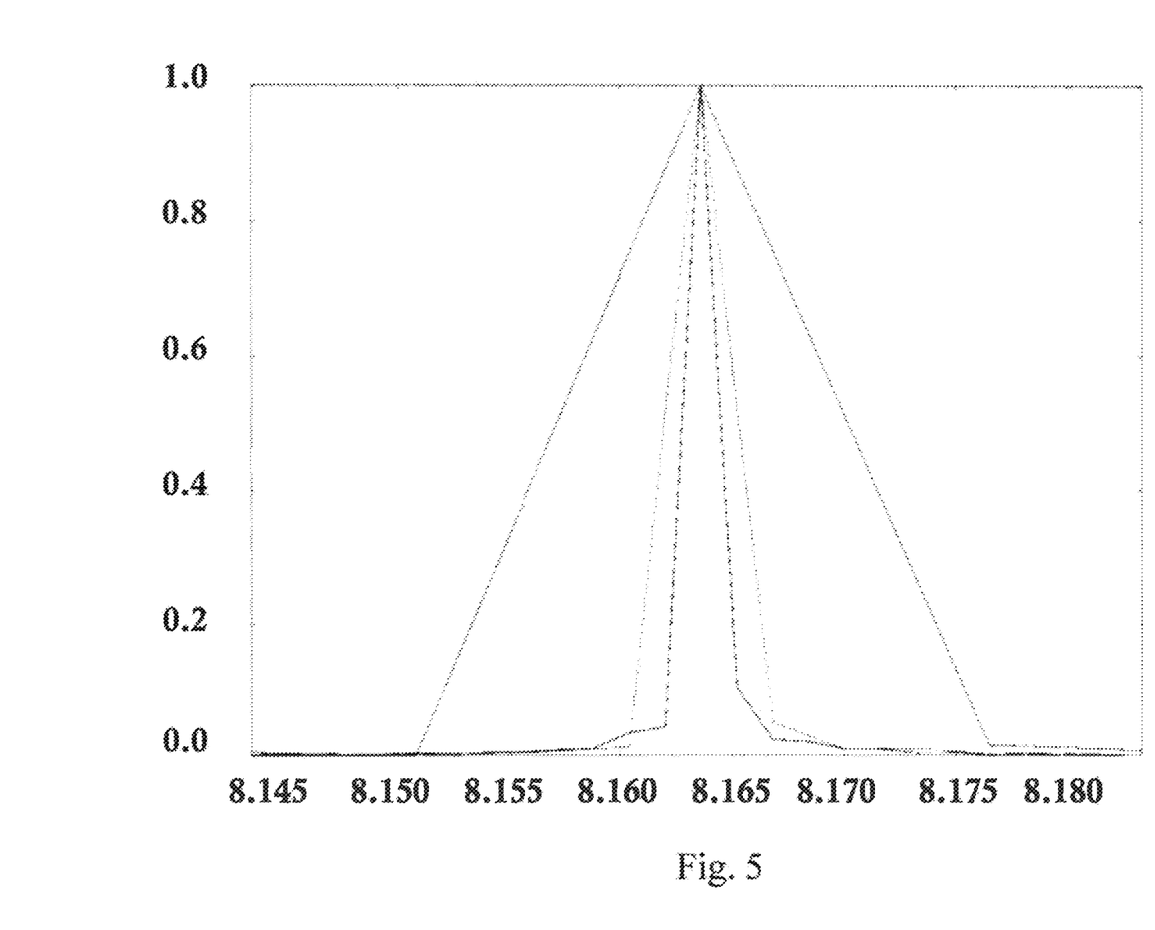
FIG. 5 is a sample tunable Quantum Cascade Laser (QCL) Spectrum plotting wavelength vs. normalized amplitude.

The present application also utilizes more recent technology development items such as laser diodes and QCL laser sources to fill the spectrum. FIG. 4 shows a NIR laser diode spectrum (1.06 micron with 3 nm bandwidth) plotted in wavelength (in nanometers)'vs. normalized amplitude. Specifically, the NIR laser diode spectrum in FIG. 4 is a spectral profile of laser radar (LADAR) projector laser. FIG. 5 shows a sample tunable QCL spectrum (7.9-8.5 micron QCL with 1 nm bandwidth) plotted in wavelength (in micrometers) vs. normalized amplitude. Overall, at upper atmosphere, the solar irradiance is approximately 0.2 watts per square centimeter per micron at the 0.5 micron spectral peak. The irradiance rapidly decreases to less than 0.05 watts per square centimeter per micron below 0.4 micron and above 1 micron. Beyond 2 microns, the irradiance level is well below 0.01 watts per square centimeter per micron.

It was found that for the case of 5% power being coupled into the sensor unit with a 20 centimeter aperture, the area that needs to be illuminated is 314 square centimeters. And, for a midwave case (having a wavelength around 4 microns), the power needed is less than 2 W per micron. Since, several lasers will be used per micron for the midwave, the laser output power required will be less than 1 W. Thus, the use of low power lasers of various wavelengths works well to allow the present application to simulate various atmospheric and weather conditions (including altitudes).

By efficiently superposing several light sources one upon another, the combined light sources together produce the desired spectrum. For the purposes of this application, to "superpose" is defined as "to lay or place on, over, or above something else". Thus, several light sources are beamed to a given target so that the light beams are superposed one upon another at a certain designated area. This is in contrast to conventional solar simulator systems which start with a very broad and uncontrollable light that has to be filtered out and have light subtracted from it to produce anything close to the desired spectrum. Such a conventional approach does not produce precise spectra and does not allow spectra to be changed rapidly. In contrast, the present application does produce precise spectra and allows for various conditions of atmosphere and material characteristics to be simulated quickly without changing sources, and does not require using filters to subtract portions of the combined spectrum. In some cases, embodiments of the present application may however add filters when needed in order to simulate specific atmospheric conditions or to modify amplitude to match a desired spectrum.

Figure 6:
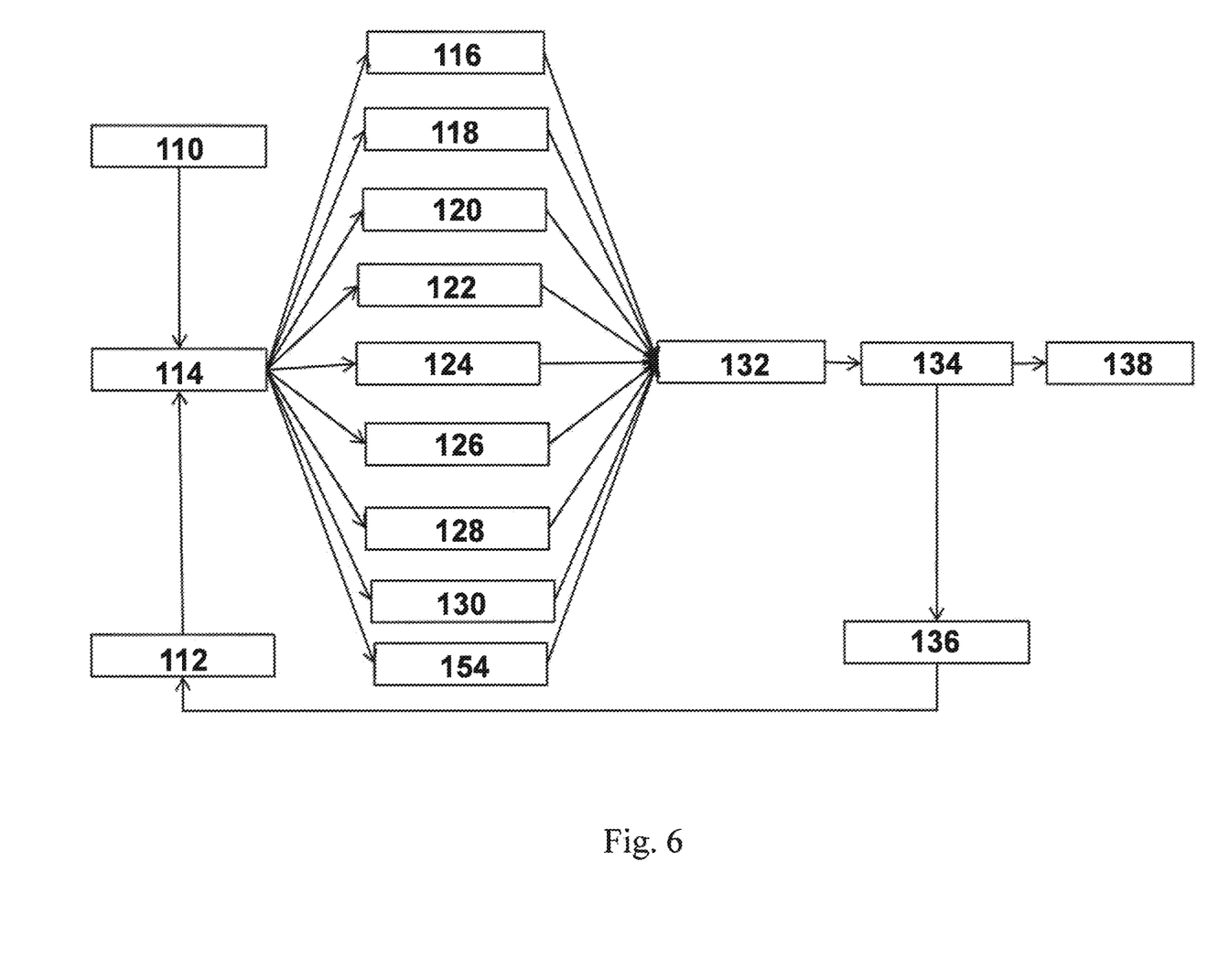
FIG. 6 shows a block diagram of the main functional components of an embodiment of the solar spectrum simulator.

FIG. 6 shows a block diagram illustrating the interrelationships of the functional components of an embodiment of the present application. The parts include: spectrum amplitude optimizer software 110, a spectrum controller 112, an emitter controller 114, a xenon/IR lamp 116, a blackbody radiator 118, a UV laser 120, a visible laser 122, an NIR laser 124, an SWIR laser 126, an MWIR laser 128, an LWIR laser 130, a QCL laser source 154, an integrating sphere 132, a beam profiler 134, a spectrometer 136, and a sensor UUT 138. The spectrometer 136 in turn feeds back to the spectrum controller 112.

Figure 7:
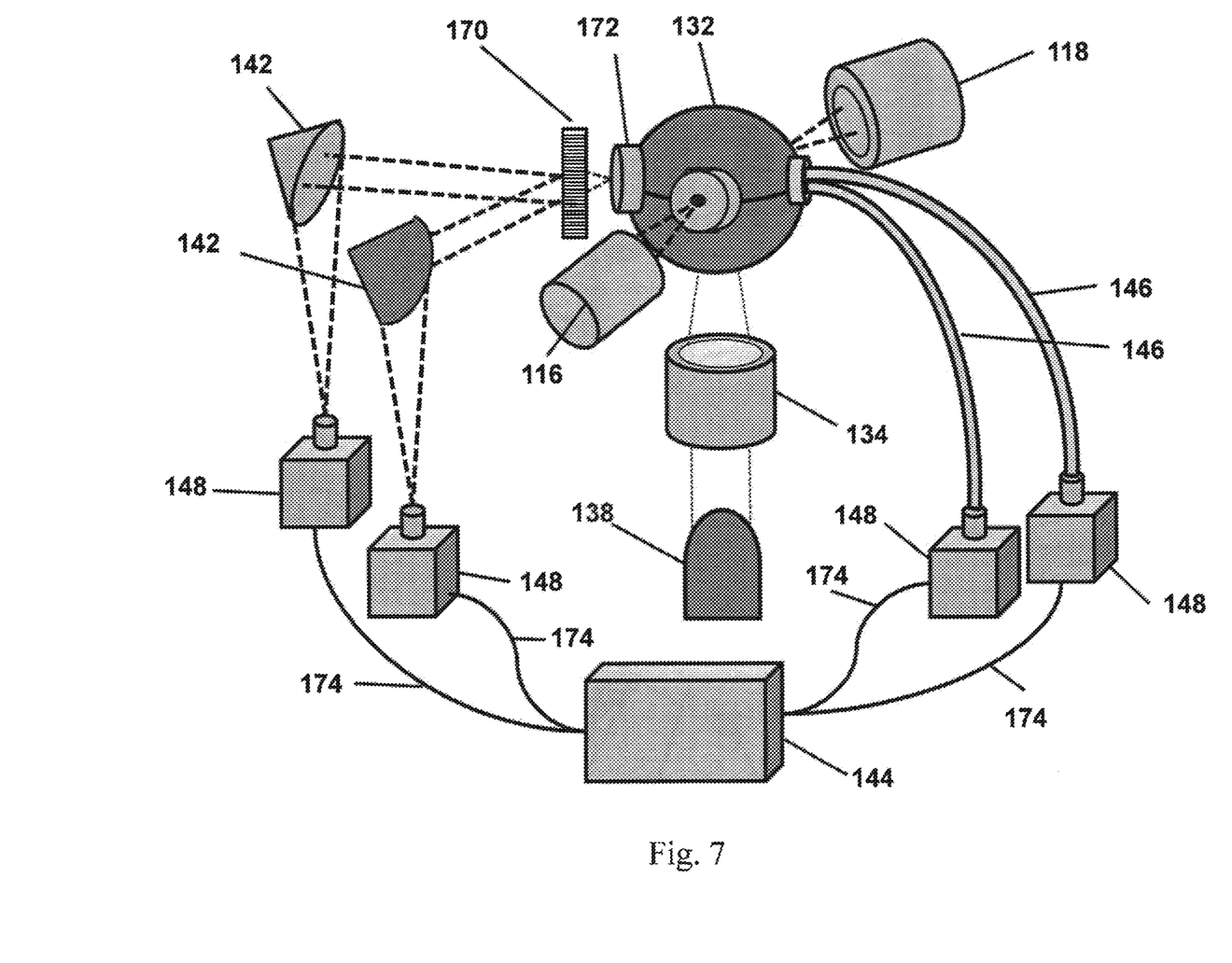
FIG. 7 shows a schematic diagram of the major functional parts of an embodiment of the solar spectrum simulator.

FIG. 7 shows a schematic diagram of an embodiment of the present application. In it, an electrical source 144 is connected by electrically conductive cables 174 to several laser emitters 148, on the lower left hand side and lower right hand side of the schematic, respectively. On the lower left of the schematic, two of the laser emitters 148 beam light up to two collimating mirrors 142, respectively. The two collimating mirrors 142 bend and reflect light so that the light beams into an integrating sphere 132 after passing through a diffraction grating 170. The integrating sphere 132 works in combination with at least one diffraction grating 170. The diffraction grating 170 is incorporated into the integrating sphere 132 so that several different laser sources can be combined into a single input port 172 of the integrating sphere 132. The number of ports and port sizes, including the size of both the input port 172 and the output port (not shown) are limited by the diameter of the integrating sphere 132 and other design constraints. In general, fewer ports are more desirable. A simple theoretical analysis indicates that an up to 2 micron separation is necessary to combine two to three laser sources into a single input port 172. This can be accommodated by a custom built diffraction grating 170. The diffraction grating 170 functions to minimize the number of input ports. On the lower right of the schematic of FIG. 7, two of the laser emitters 148 are shown beaming light directly to the integration sphere 132 through optical/hollow fibers 146 rather than by means of collimating mirrors 142. The integrating sphere 132 is used to uniformly scatter light rays. In the present application, for experiments with the integrating sphere 132 in the IR band, a gold coated, reflective, integrating sphere 132 has been utilized. However, an aluminum integrating sphere 132, which is more difficult to maintain due to oxidation concerns, is preferred for visible spectrum applications because it minimizes the presence of gold colored tint in the visible spectrum. There are several ways to minimize the oxidation concerns arising from the aluminum integrating sphere 132. One way uses an environmental chamber (not shown) to establish conditions in which the optimal materials (such as aluminum) can be used in the integrating sphere 132. Another way uses coatings such as magnesium fluoride or lithium fluoride to decrease oxidation in an aluminum integrating sphere 132. Coatings can provide good spectral reflectance down to the deep UV region, but the directional reflectance can be a concern when coatings are used. Thus, the calibration system is even more important for the coated aluminum integrating sphere 132.

As stated previously, the collimating mirrors 142 beam the light to the integrating sphere 132 as shown in the schematic of FIG. 7. A xenon/IR lamp 116 and a blackbody radiator 118 are also each located separately in a position to beam light to the integrating sphere 132 as shown in FIG. 7. The housing of the xenon/IR lamp 116 can be directly attached to the integrating sphere 132. The integrating sphere 132 itself then beams the combined light onto the sensor UUT 138 through the beam shaping and profiling optics 134, located directly below the integrating sphere 132 in this embodiment. The beam shaping optics 134 will provide a beam that is as uniform as possible in amplitude and as flat as possible in phase.

Figure 8:
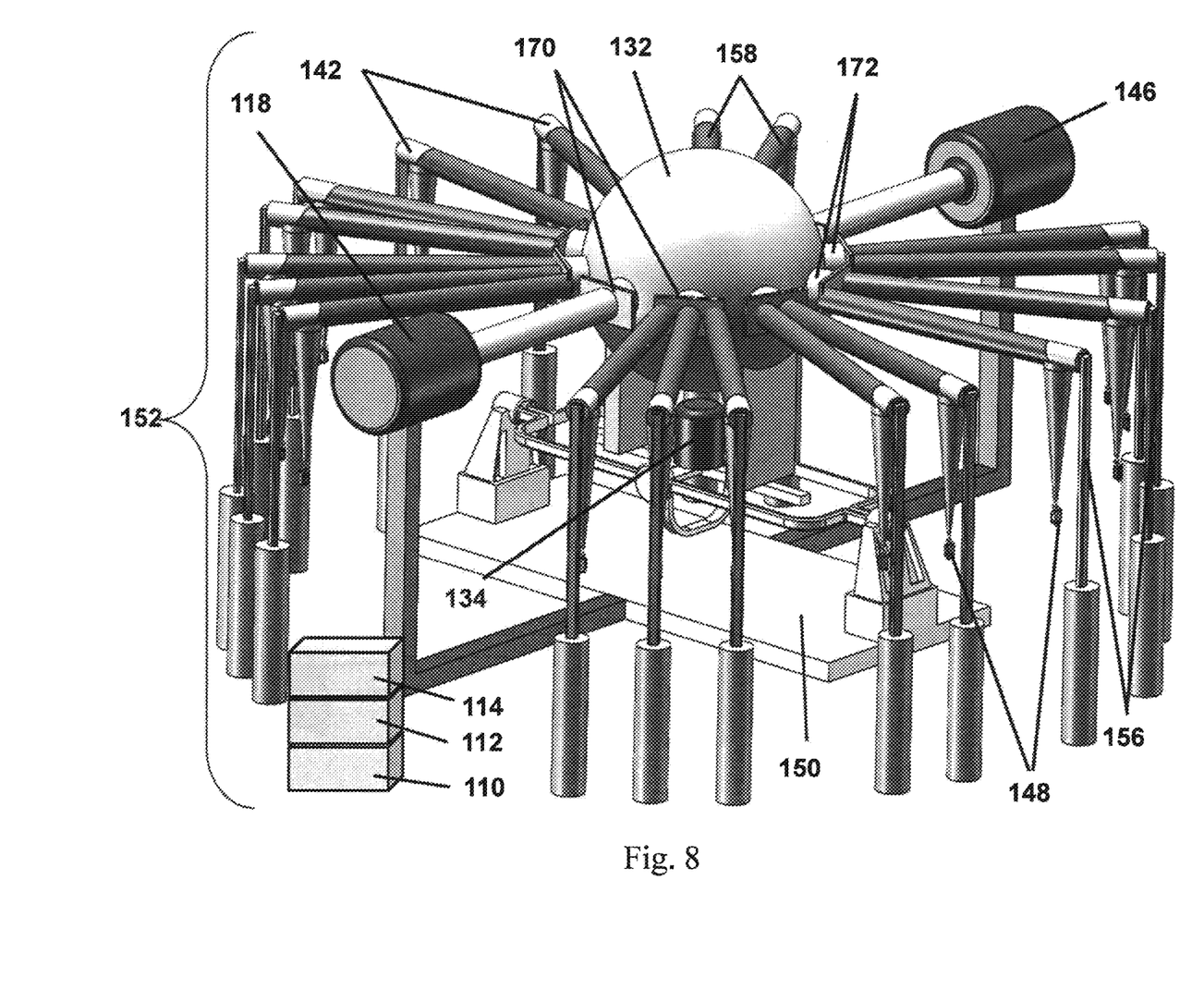
FIG. 8 shows an upper side view of one embodiment of the solar spectrum simulator.

FIG. 8 shows a perspective view of one embodiment of the solar spectrum simulator 152 of the present application. In the embodiment, vertical poles 156 and horizontal poles 158 are positioned around the integrating sphere 132 which is at the top of the solar spectrum simulator 152. The tops of the vertical poles 156 are connected perpendicularly to the horizontal poles 158 which radially extend from the connecting point with the vertical poles 156 into the integrating sphere 132. The solar spectrum simulator 152 extends around and above a 3-axis motion table 150 on which can be placed an object to be tested. The spectrum composition optimizer software 110 is connected to and controls the activity of the spectrum controller software 112 which in turn is connected to and controls the activity of the emitter driver software 114, all of which software is located outside of the solar spectrum simulator 152. The emitter driver software 114 is in communication with the xenon/IR lamp 116, the blackbody radiator 118, and the laser emitters 148 in the solar spectrum simulator 152. In order to be able to generate a customizable spectrum, several sources of light are employed. By using base spectrum emitters such as xenon/IR lamps 116 and high temperature cavity black body radiator sources 118, a base spectrum is achieved. To achieve the desired resolution and amplitude of very hot objects (like the sun) without using an enormous power source, the present application adds to this base spectrum a set of laser emitters 148. These include laser diodes such as UV lasers 120, visible lasers 122, NIR lasers 124, SWIR lasers 126, MWIR lasers 128 and LWIR lasers 130, as well as at least one QCL laser source 154. The laser emitters 148 therefore include both QCL lasers 154 and laser diodes. As shown, the laser emitters 148 are in the form of small units suspended directly below the beam collimator units 142. The beam collimator units 142 are positioned at the top of the vertical poles 156 located around the solar spectrum simulator 152. The light from the laser emitters 148 is beamed upward to the beam collimators 142 where it is then beamed from the beam collimators 142 radially to the integrating sphere 132. This is done concurrently with the beaming of light from the xenon/IR lamp 116 and the blackbody radiator 118 to the integrating sphere 132. The black body radiator 118 and xenon/IR lamps 116 are also each positioned at the top of vertical poles 156 located around the circumference of the solar spectrum simulator 152.

In one embodiment, as shown in FIG. 8, horizontal tubes 158 extend between the beam collimators 142 and the integrating sphere 132. The light from the beam collimators 142 is beamed through the horizontal tubes 158 to the integrating sphere 132. In an alternative embodiment, the light from the beam collimator 142 is beamed directly to the integrating sphere 132 without the horizontal tubes 158.

Similarly, in one embodiment, also as shown in FIG. 8, the xenon/IR lamp 116 and the blackbody radiator 118 each beam light through horizontal tubes 158 extending radially to the integrating sphere 132. In another alternative embodiment, the xenon/IR lamp 116 and blackbody radiator 118 beam light directly to the integrating sphere 132 without the horizontal tubes 158.

As shown in FIG. 8, after receiving light directly from the xenon/IR lamp 116, and the blackbody radiator 118 as well as from the laser emitters 148 via the beam collimators 142, the integrating sphere 132 in turn beams light down vertically to the beam profiler 134. The beam profiler 134 in turn beams light to the 3-axis motion table 150. The 3-axis motion table 150 is situated to be able to contain an item to be tested on its surface.

Figure 9:
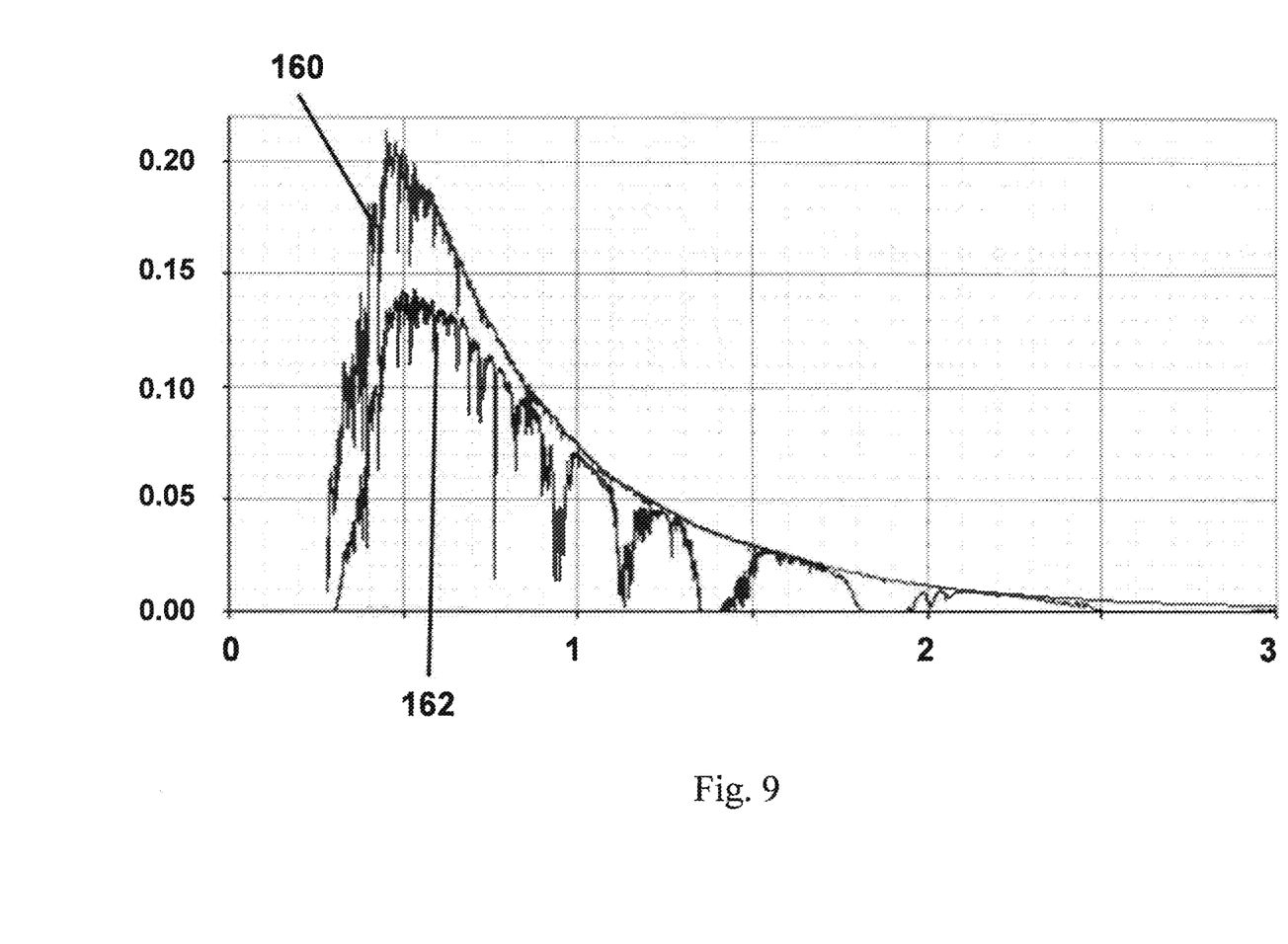
FIG. 9 shows two solar spectra combined in a graph plotting wavelength vs. irradiance which together approximately form a complete solar spectrum.

FIG. 9 shows two separate sample spectra, an upper spectrum 160 and a lower spectrum 162, taken from actual solar light and combined in a graph plotting wavelength (tens of micrometers) vs. irradiance (milliwatts per centimeter squared). As shown in FIG. 9, the two sample spectra are superimposed on each other. These solar-light spectra in FIG. 9 are a model for the artificial spectra shown in FIG. 10.

Figure 10:
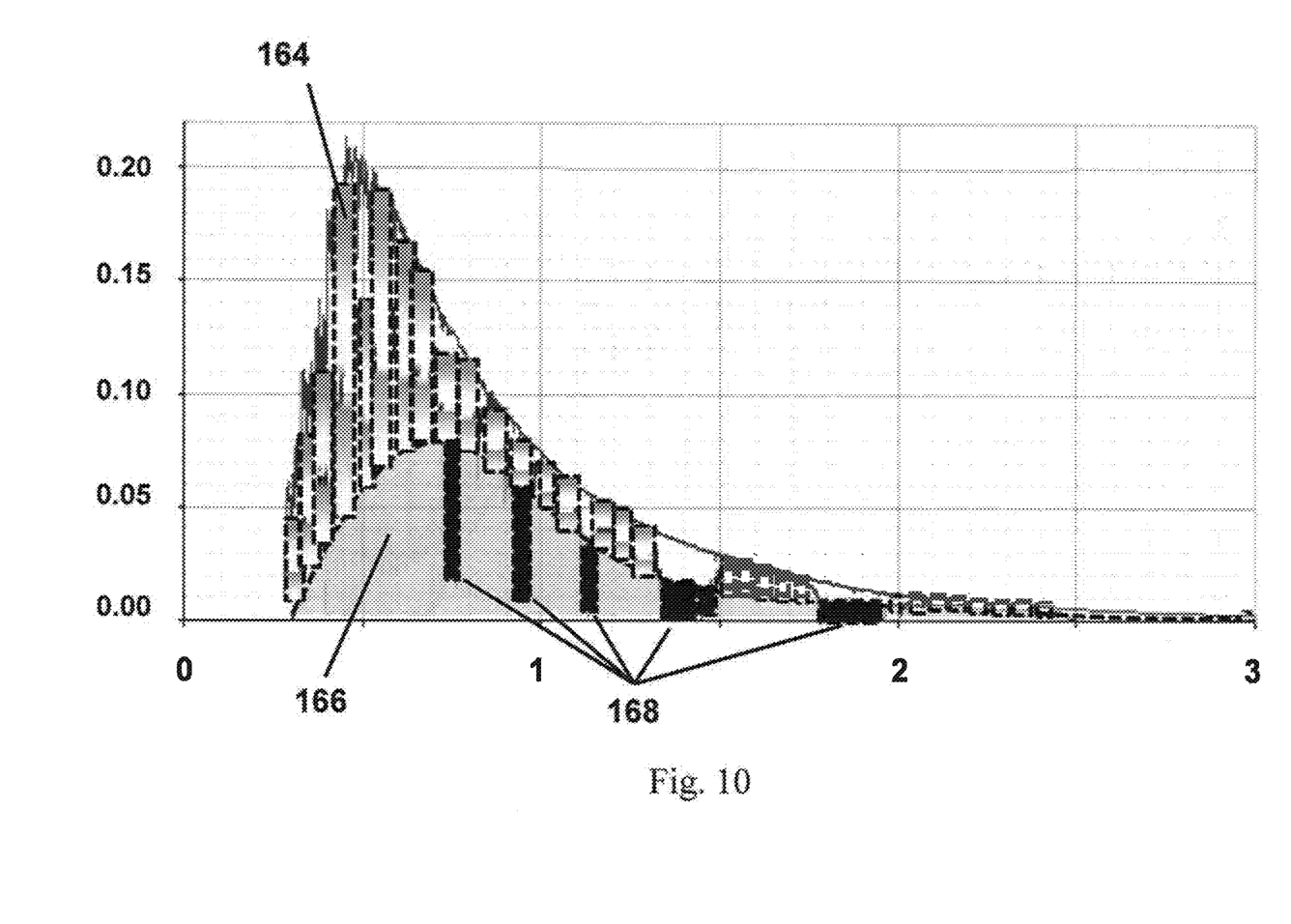
FIG. 10 shows an Ultraviolet (UV) to Long Wavelength Infrared (LWIR) simulated solar spectrum in a graph plotting wavelength vs. irradiance created with a base spectrum, absorptive filters, and lasers, all of which were produced by the solar spectrum simulator of the present application.

FIG. 10 shows a spectrum from the solar simulator of the present application in a graph plotting wavelength (tens of micrometers) vs. irradiance (milliwatts per centimeter squared). This spectrum of FIG. 10 artificially approximates an actual solar spectrum. Specifically, it shows the results of superposing a base spectrum 166 and a laser spectrum 164 in an integrating sphere 132. The spectrum of FIG. 10 additionally shows filtered portions 168 in the UV to LWIR spectrum which have been achieved with absorptive filters (not pictured) and have been created to simulate atmospheric conditions.

In the solar simulator system of the present application, each of these xenon/IR lamps 116, high temperature cavity blackbody radiator sources 118, and laser emitters 148 are individually controlled to provide a specific spectrum in each wavelength region. A set of filters (not pictured) can optionally be used to create absorption bands in one or more regions, when needed, in order to create simulated atmospheric conditions or replicate specific amplitudes in light spectra. This is done by placing filters (not pictured) between at least one of a) the xenon/IR lamp 116 and the integrating sphere 132; b) high temperature cavity blackbody radiator sources 118 and the integrating sphere 132; and c) laser emitters 148 and beam collimating mirrors 142. Analogously, absorption bands are created in real sunlight when actual atmospheric conditions cause it.

Each laser produces "in band radiance" (i.e. radiance computed from a specific light wavenumber to infinity for a blackbody at a given temperature) to replicate the level of solar irradiance that occurs in the upper atmosphere. One of the main advantages of using QCLs 154 is that ideally these lasers can be designed to output approximately any wavelength.

In the present application, the individual parts of the spectrum are superposed together by the integrating sphere 132 to form a single spectrum. In an embodiment, the integrating sphere 132 includes at least one diffraction grating 170 that allows several sources of light to be superposed together to form one broad spectrum. The integrating sphere 132 with the at least one diffraction grating 170 is designed to add together light sources having a sub micron bandwidth (i.e., below 1 micron). The combined beams are then shaped by a beam profiler 134 to produce a "top hat" profile to better simulate a uniform source. The optics output from the beam profiler 134 is split. A part of the optics output is sent to a spectrometer 136 to verify that the outputted spectrum matches the desired spectrum for the given sensor UUT 138. The other part of the optics output, in the form of the outputted light spectrum, goes to the sensor UUT 138 being tested. The spectrum analyzer data from the spectrometer 136 is sent to the spectrum amplitude controllers 110. The spectrum amplitude controllers 110 then modify the amplitude of the beams, if necessary, to conform to the requirements of the desired spectrum.

The present application can be used for the simulation and testing of the U.S. military's existing and future missiles, as well as for testing the IR sensors used for guided missiles. Among other things, the present application can also be used for testing solar panels, for medical uses, and for producing customized spectra for use with sensors that operate in one or more of UV, visible and IR spectra. For such sensors, it is often the case that they need to be tested with a spectrum that has a precise shape and amplitude.

The present application provides a flexible method to arbitrarily produce on demand a precise solar-like spectrum which extends from UV to LWIR. The spectrum in the present application can also be user controlled to change with time. The present application also uses several different light sources efficiently and superposes different beams of light into a whole, undivided spectrum rather than using a subtractive method.

The present application provides programmable, arbitrary spectra in the context of a simulated solar spectrum. The present application also avoids the difficulties associated with outdoor testing by providing a realistic spectral exposure in a laboratory environment.

The present application relates to a solar spectrum simulator 152 capable of producing a light spectrum including wavelengths from 200 nm to 20 microns. The simulator comprises: a) base spectrum emitters beaming light into an integrating sphere, the base spectrum emitters including: at least one xenon/infrared (IR) lamp 116 and at least one blackbody radiator 118; b) laser generation emitters 148 beaming light into collimating mirrors 142, the laser generation emitters 148 including at least one ultraviolet (UV) laser source 120, at least one visible laser source 122, at least one near infrared (NIR) laser source 124, at least one short wavelength (SW) laser source 126, at least one medium wavelength (MW) laser source 128, at least one long wavelength (LW) laser source 130, and at least one quantum cascade laser source (QCL) 154; c) collimating mirrors 142 receiving beamed light directly from at least one of the laser generation emitters 148; d) software including: i) amplitude optimization software 110; ii) a spectrum controller 112; ili) an emitter controller 114, the emitter controller 114 being controlled by the amplitude optimization software 110 and the spectrum controller 112; the emitter 1 controller 114 controlling the base spectrum emitters and the laser generation emitters 148; e) the integrating sphere 132 including at least one diffraction grating 170, the integrating sphere 132 receiving light from both the base spectrum emitters and the collimating mirrors 142; f) a beam profiler 134 receiving beamed light from the integrating sphere 132; g) a surface 150 providing space for an item to be tested, the surface receiving beamed light from the beam profiler 134; and h) a spectrometer 136 receiving beamed light from the beam profiler 134, the spectrometer 136 generating and feeding back wavelength information about the beamed light to the spectrum controller 112.

In an embodiment of the solar spectrum simulator 152, additional laser generation emitters 148 beam light directly to the integrating sphere 132 through optical/hollow fibers 146, the light bypassing the collimating mirrors 142.

In another embodiment of the solar spectrum simulator 152, the solar spectrum simulator 152 has a spectral resolution of at most approximately 0.1 micrometer increments.

In still another embodiment of the solar spectrum simulator 152, the xenon/IR lamp 116, the blackbody radiator 118 and the laser generation emitters 148 are individually controlled.

In yet another embodiment of the solar spectrum simulator 152, the solar spectrum simulator 152 is programmed to change spectra after a specific time interval of one microsecond or more.

In another embodiment of the solar spectrum simulator 152, absorptive filters (not pictured) are inserted between at least one of a) the xenon/IR lamp 116 and the integrating sphere 132, b) the blackbody radiator 118 and the integrating sphere 132, and c) the laser generation emitters 148 and the collimating mirrors 142 for the purpose of simulating atmospheric absorption or for the purpose of modifying light amplitude to match a desired spectrum.

In still another embodiment of the solar spectrum simulator 152, each laser of the laser generation emitters 148 produces at least approximately: 1) 1W in the NIR and MWIR and 2) 50 mW in the LWIR, each of which is used to replicate the level of solar irradiance in the upper atmosphere.

In still another embodiment, each laser of the laser generation emitters 148 of the solar spectrum simulator 152 produces radiance from 1.0 to 100 W sufficient to replicate the level of solar irradiance in the upper atmosphere.

In yet another embodiment of the solar spectrum simulator 152, the diffraction grating 170 in the integrating sphere 132 diffracts light sources into beams having a bandwidth less than 2 microns.

The present application also relates to a method of testing an item with a spectrally precise, artificial solar spectrum including wavelengths from 200 nm to 20 microns produced by a solar spectrum simulator 152. The method comprises the steps of: a) directing beams of light from laser generation emitters 148 to collimating mirrors 142; the laser generation emitters 148 including: at least one ultraviolet (UV) laser source 120, at least one visible laser source 122, at least one near infrared (NIR) laser source 124, at least one short wavelength (SW) laser source 126, at least one medium wavelength (MW) laser source 128, and at least one long wavelength (LW) laser source 130; the directing being accomplished by controlling the laser generation emitters 148 with spectrum optimizer software 110, a spectrum controller 112, and an emitter controller 114; b) directing by collimating mirrors 142 the beams of light from laser generation emitters 148 to an integrating sphere 132 including a diffraction grating 170; c) directing beams of light from base spectrum emitters to the integrating sphere 132, the base spectrum emitters including at least one xenon/infrared (IR) lamp 116 and at least one blackbody radiator 118; d)

combining the directed beams of light with the integrating sphere 132; e) profiling the combined beams of light with a beam profiler 134 to produce a profiled beam simulating a uniform source; f) measuring wavelengths of the profiled beams with a spectrometer 136, the spectrometer 136 feeding back the wavelength of the profiled beams to the spectrum controller 112; g) adjusting, if necessary, with the spectrum controller 112 the wavelength of the combined profiled beams, based on the feedback from the spectrometer 136; h) beaming the combined beams onto a surface 150 on which is provided space for an item to be tested.

In an embodiment of the method, additional laser generation emitters 148 beam light directly to the integrating sphere 132 through optical/hollow fibers 146, the light bypassing the collimating mirrors 142.

In yet another embodiment of the method, the solar spectrum simulator 152 has spectral resolution of at most approximately 0.1 micrometer increments.

In still another embodiment of the method, at least one of the directing steps of the method is done by individually controlling the xenon/IR lamp 116, the blackbody radiator 118 and the laser generation emitters 148.

In another embodiment of the method, the solar spectrum simulator 152 is programmed to change spectra after a specific time interval of 1 microsecond or more.

In another embodiment of the method, absorptive filters (not pictured) are placed between at least one of a) the xenon/IR lamp 116 and the integrating ... sphere 132; b) the blackbody radiator 118 and the integrating sphere 132; and c) the laser generation sources 148 and the collimating mirrors 142, for the purpose of simulating atmospheric absorptions or for the purpose of modifying amplitude of the light to match a desired spectrum.

In still another embodiment of the method, each laser of the laser sources produces at least approximately 1) 1W in the NIR and MWIR; and 2) 50 mW in the LWIR to replicate the level of solar irradiance in the upper atmosphere.

In another embodiment of the method, each laser of the laser generation sources produces radiance from 1.0 to 100 W sufficient to replicate the level of solar irradiance in the upper atmosphere.

In yet another embodiment of the method, the diffraction grating 170 in the integrating sphere 132 diffracts light sources into beams having a bandwidth less than 2 microns.

The present application also relates to a solar spectrum simulator system 152 which is capable of producing a light spectrum, including wavelengths from 200 nm to 20 microns. The system comprises: a) base spectrum emitters beaming light into an integrating sphere 132, the base spectrum emitters including: at least one xenon/infrared (IR) lamp 116 and at least one blackbody radiator 118; b) laser generation emitters beaming light into collimating mirrors 142, the laser generation emitters 148 including at least one ultraviolet (UV) laser source 120, at least one visible laser source 122, at least one near infrared (NIR) laser source 124, at least one short wavelength (SW) laser source 126, at least one medium wavelength (MW) laser source 128, at least one long wavelength (LW) laser source 130, and at least one quantum cascade laser source (QCL) 154; c) collimating mirrors 142 receiving beamed light directly from at least one of the laser generation emitters 148; d) software including i) amplitude optimization software 110; ii) a spectrum controller 112; iii) an emitter controller 114, the emitter controller 114 being controlled by the amplitude optimization software 110 and the spectrum controller 112, the emitter controller 114 controlling the base spectrum emitters (xenon/infrared (IR) lamp 116 and/or blackbody radiators 118) and the laser generation emitters 148; e) the integrating sphere 132 including at least one diffraction grating 170, the integrating sphere 132 receiving light from both the base spectrum emitters and the collimating mirrors 142; f) a beam profiler 134 receiving beamed light from the integrating sphere 132; g) a three-axis motion table 150 providing space for a sensor unit under test (UUT) 138, the table 150 receiving beamed light from the beam profiler 134; and h) a spectrometer 136 receiving beamed light from the beam profiler 134, the spectrometer 136 generating and feeding back wavelength information about the beamed light to the spectrum controller 112.

In an embodiment of the solar spectrum simulator system 152, additional laser generation emitters 148 beam light directly to the integrating sphere 132 through optical hollow fibers 146, the light bypassing the collimating mirrors 142.

EXAMPLES

Example 1

Several spectral characteristics of laser diodes and QCL 154 have been measured, and potential beam combiner options have been evaluated. A small gold coated reflective integrating sphere 132, including diffraction gratings 170, has been devised and used successfully to combine two IR sources to produce a combined spectrum.

Example 2

Several devices including blackbody radiators 118, IR lamps 116, laser diodes and QCL lasers 154 were tested and used for their spectral characteristics in the solar spectrum simulator 152 of the present application. Blackbody radiators 118, laser diodes and QCL lasers 154 have also been tested and found to have characteristics that are useful in a solar spectrum simulator 152 with a larger integrating sphere 132, including diffraction gratings 170, for specific wavelengths. IR lamps 116 have not yet been tested for their usefulness in a larger integrating sphere 132.

Example 3

Tests were performed that showed that a preferred way to add visible spectrum to the IR spectrum is to add aluminum (or "aluminum-like" metal which does not add color) to reduce the gold tint in the visible spectrum that occurs when gold is used in the integrating sphere 132.

Example 4

Different diffraction gratings 170 have been tested in a smaller gold coated reflective integrating sphere 132 and in a larger integrating sphere 170. The results show the effectiveness of diffraction gratings 170, which function to combine multiple sources of light and feed them into a single port.

Example 5

When missile sensors were tested using the present application, some testing was conducted in a controlled environment with, as much as possible, the precise spectra that sensors may be exposed to in a given real environment. In several cases, the tested spectra were able to replicate the imageries obtained with a given sensor in natural sunlight.

While several embodiments have been described in detail, it will be apparent to those skilled in the art that the disclosed embodiments may be modified. Therefore, the foregoing description is to be considered exemplary rather than limiting.

What is claimed is:

1. A solar spectrum simulator capable of producing a light spectrum including wavelengths from 200 nm to 20 microns, the simulator comprising:
   a) base spectrum emitters beaming light into an integrating sphere, the base spectrum emitters including: at least one xenon/infrared (IR) lamp and at least one blackbody radiator;
   b) laser generation emitters beaming light into collimating mirrors, the laser generation emitters including at least one ultraviolet (UV) laser source, at least one visible laser source, at least one near infrared (NIR) laser source, at least one short wavelength (SW) laser source, at least one medium wavelength (MW) laser source, at least one long wavelength (LW) laser source, and at least one quantum cascade laser source (QCL);
   c) collimating mirrors receiving beamed light directly from at least one of the laser generation emitters;
   d) software including i) amplitude optimization software; ii) a spectrum controller; iii) an emitter controller; the emitter controller being controlled by the amplitude optimization software and the spectrum controller; the emitter controller controlling the base spectrum emitters and the laser generation emitters;
   e) the integrating sphere including at least one diffraction grating, the integrating sphere receiving light from both the base spectrum emitters and the collimating mirrors;
   f) a beam profiler receiving beamed light from the integrating sphere;
   g) a surface providing space for an item to be tested, the surface receiving beamed light from the beam profiler; and
   h) a spectrometer receiving beamed light from the beam profiler, the spectrometer generating and feeding back wavelength information about the beamed light to the spectrum controller.

2. The solar spectrum simulator of claim 1, further comprising additional laser generation emitters which beam light directly to the integrating sphere through optical/hollow fibers, the light bypassing the collimating mirrors.

3. The solar spectrum simulator of claim 1, wherein the solar spectrum simulator has a spectral resolution of at most approximately 0.1 micrometer increments.

4. The solar spectrum simulator of claim 1, wherein the base spectrum emitters and laser generation emitters are individually controlled.

5. The solar spectrum simulator of claim 1, wherein the solar spectrum simulator is programmed to change spectra after a specific time interval of 1 microsecond or more.

6. The solar spectrum simulator of claim 1, further comprising absorptive filters inserted between at least one of a) the xenon/infrared IR lamp and the integrating sphere; b) the blackbody radiator and the integrating sphere; and c) the laser generation emitters and the collimating mirrors, for the purpose of simulating atmospheric absorption or for the purpose of modifying light amplitude to match a desired spectrum.

7. The solar spectrum simulator of claim 1, wherein each laser of the laser generation emitters produces at least approximately: 1) 1 W within the NIR and MWIR; and 2) 50 mW within the LWIR, each of which is used to replicate the level of solar irradiance in the upper atmosphere.

8. The solar spectrum simulator of claim 1, wherein each laser of the laser generation emitters produces radiance from 1.0 to 100 W sufficient to replicate the level of solar irradiance in the upper atmosphere.

9. The solar spectrum simulator of claim 1, wherein the diffraction grating in the beam combiner diffracts light sources into beams having a bandwidth less than 2 microns.

10. A method of testing an item with a spectrally precise, artificial solar spectrum including wavelengths from 200 nm to 20 microns produced by a solar spectrum simulator comprising the steps of:
   a) directing beams of light from laser generation emitters to collimating mirrors, the laser generation emitters including: at least one ultraviolet (UV) laser source, at least one visible laser source, at least one near infrared (NIR) laser source, at least one short wavelength (SW) laser source, at least one medium wavelength (MW) laser source, and at least one long wavelength (LW) laser source; the directing being accomplished by controlling the laser generation sources with spectrum optimizer software, a spectrum controller; and an emitter controller;
   b) directing by collimating mirrors the beams of light from laser generation emitters to an integrating sphere including a diffraction grating;
   c) directing beams of light from base spectrum emitters to the integrating sphere, the base spectrum emitters including at least one xenon/infrared (IR) lamp and at least one blackbody radiator;
   d) combining the directed beams of light with the integrating sphere;
   e) profiling the combined beams of light with a beam profiler to produce a profiled beam simulating a uniform source;
   f) measuring wavelengths of the profiled beams with a spectrometer, the spectrometer feeding back the wavelength of the profiled beams to the spectrum controller;
   g) adjusting, if necessary, with the spectrum controller the wavelength of the combined profiled beams, based on the feedback from the spectrometer; and
   h) beaming the combined beams onto a surface on which is provided space for an item to be tested.

11. The method of claim 10, wherein additional laser generation emitters beam light directly to the integrating sphere through optical/hollow fibers, the light bypassing the collimating mirrors.

12. The method of claim 10, wherein the solar spectrum simulator has spectral resolution of at most approximately 0.1 micrometer increments.

13. The method of claim 10, wherein at least one of the directing steps is done by individually controlling the xenon/IR lamp, the blackbody radiator and the laser generation emitters.

14. The method of claim 10, wherein the solar spectrum simulator is programmed to change spectra after a specific time interval of 1 microsecond or more.

15. The method of claim 10, wherein absorptive filters are inserted between at least one of a) the xenon/IR lamp 116 and the integrating sphere; b) the blackbody radiator 118 and the integrating sphere; and c) the laser generation sources 148 and the collimating mirrors 142 for the purpose of simulating atmospheric absorptions or for the purpose of modifying amplitude of the light to match a desired spectrum.

16. The method of claim 10, wherein, each laser of the laser generation emitters produces at least approximately 1)

1 W within the NIR and MWIR; and 2) 50 mW within the LWIR to replicate the level of solar irradiance in the upper atmosphere.

17. The method of claim 10, wherein each laser of the laser generation emitters produces radiance from 1.0 to 100 W to replicate the level of solar irradiance in the upper atmosphere.

18. The method of claim 10, wherein the diffraction grating in the integrating sphere diffracts light sources into beams having a bandwidth less than 2 microns.

19. A solar spectrum simulator system capable of producing a light spectrum, including wavelengths from 200 nm to 20 microns, the system comprising:
   a) base spectrum emitters beaming light into an integrating sphere, the base spectrum emitters including: at least one xenon/infrared (IR) lamp and at least one blackbody radiator;
   b) laser generation emitters beaming light into collimating mirrors, the laser generation emitters including at least one ultraviolet (UV) laser source, at least one visible laser source, at least one near infrared (NIR) laser source, at least one short wavelength (SW) laser source, at least one medium wavelength (MW) laser source, at least one long wavelength (LW) laser source, and at least one quantum cascade laser source (QCL);
   c) collimating mirrors receiving beamed light directly from at least one of the laser generation emitters;
   d) software including i) amplitude optimization software; ii) a spectrum controller; iii) an emitter controller, the emitter controller being controlled by the amplitude optimization software and the spectrum controller, the emitter controller controlling the base spectrum emitters and the laser generation emitters;
   e) the integrating sphere including at least one diffraction grating, the integrating sphere receiving light from both the base spectrum emitters and the collimating mirrors;
   f) a beam profiler receiving beamed light from the integrating sphere;
   g) a three-axis motion table providing space for a sensor unit under test (UUT), the table receiving beamed light from the beam profiler; and
   h) a spectrometer receiving beamed light from the beam profiler, the spectrometer generating and feeding back wavelength information about the beamed light to the spectrum controller.

20. The solar spectrum simulator system of claim 19, wherein additional laser generation emitters beam light directly to the integrating sphere through optical hollow fibers, the light bypassing the collimating mirrors.

* * * * *